June 7, 1966 R. B. SCHREIBER 3,254,731
VEHICLE SKIRT ELEMENT FOR GROUND EFFECT VEHICLE
Filed March 8, 1962 2 Sheets-Sheet 1
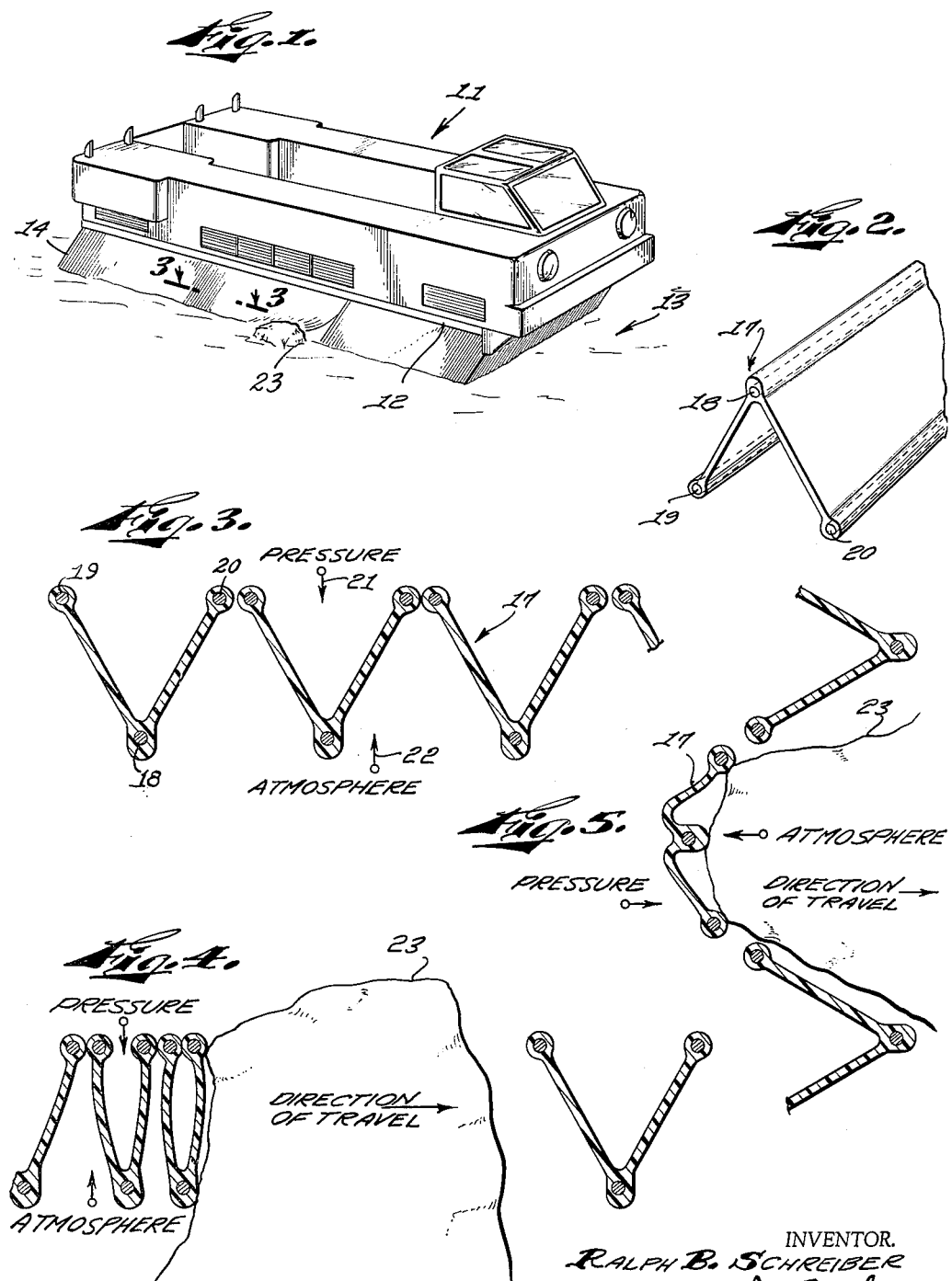
INVENTOR.
RALPH B. SCHREIBER
BY John R. Faulkner
John A. Duffy
ATTORNEYS

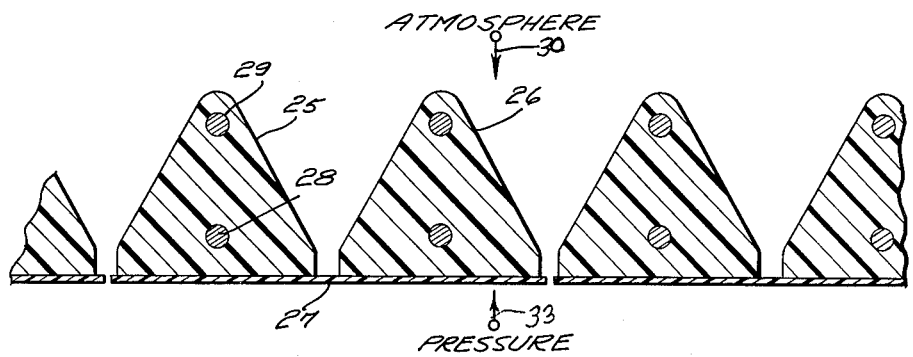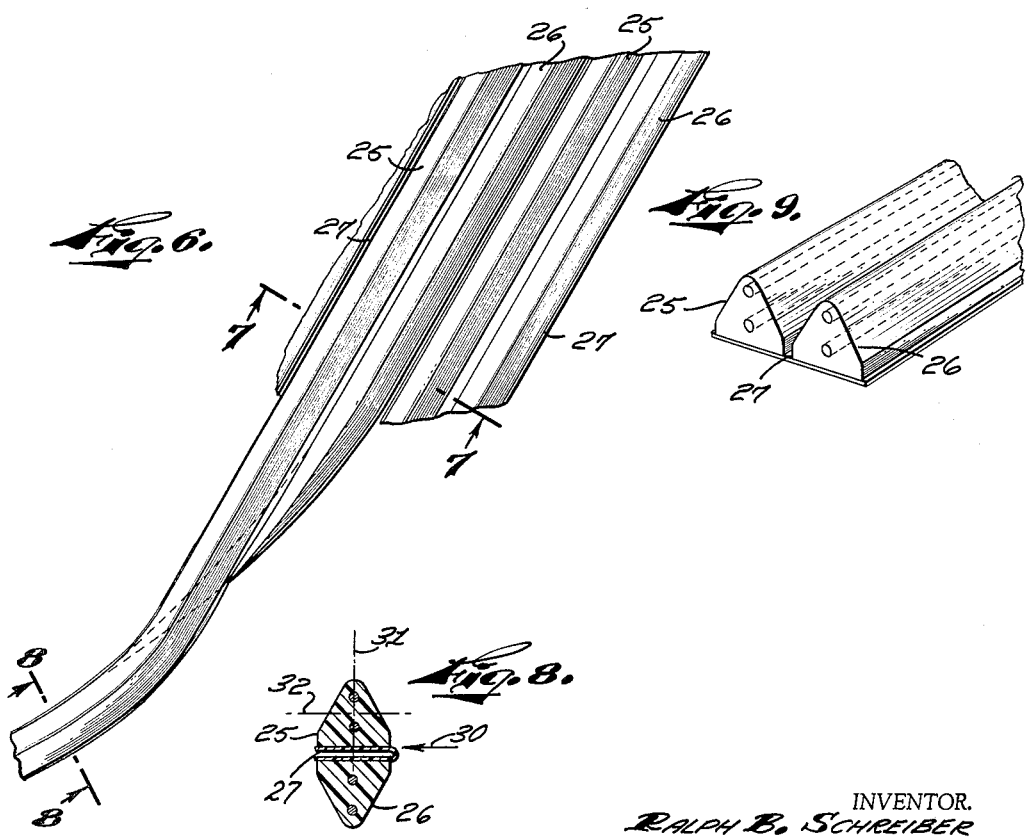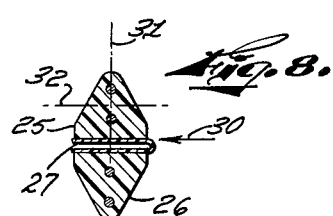

United States Patent Office
3,254,731
Patented June 7, 1966

3,254,731
VEHICLE SKIRT ELEMENT FOR GROUND EFFECT VEHICLE
Ralph B. Schreiber, Costa Mesa, Calif., assignor to Ford Motor Company, Dearborn, Mich., a corporation of Delaware
Filed Mar. 8, 1962, Ser. No. 178,373
4 Claims. (Cl. 180—7)

This invention relates to air cushion vehicles and more particularly to air cushion vehicle skirt elements for reducing air leakage and providing flexibility in the operation of a vehicle over obstacles.

Air cushion vehicles which are designed to pass over all solid obstacles encountered require a significantly large amount of power to maintain the air cushion. For example, in order for an air cushion vehicle to pass over an obstacle extending above the surface at a height of four feet the vehicle must be designed to ride on an air cushion, or bubble at a height of four feet or more. The large amount of power necessary to generate and maintain such an air cushion seriously affects the efficiency, size, and other operational characteristics of the vehicle. Accordingly, it is an object of the invention to provide an improved air cushion vehicle.

In a co-pending application, now abandoned, filed by the assignee of the present case on January 12, 1962, bearing Serial No. 165,860, and entitled "Air Cushion Vehicle Skirt," air cushion skirt elements are described which tend to reduce the large amount of power required to clear obstacles. According to the skirt element of the above mentioned application, a flexible skirt arrangement is provided for containing the air which forms around the vehicle cushion while at the same time allowing solid objects encountered to pass throughout the flexible skirt without damaging the vehicle. In this way, the effective height of the vehicle can be raised without large power requirements for maintaining the air cushion or bubble. A minimum amount of power is utilized to maintain an air cushion of substantial height.

The present invention is an improvement over the above mentioned application by providing a skirt element of improved strength and flexibilty.

According to one aspect of the invention, an air cushion vehicle is provided with a plurality of flexible skirt elements enclosing a portion of the air cushion or bubble beneath the vehicle. The flexible elements combine to provide a flexible skirt for preventing leakage of air from the bubble and passing solid objects over which the vehicle passes. Each of the flexible elements comprises a main rod having embedded therein at least two reinforcing rods providing a greater stability when loaded by air from the bubble than when loaded by solid objects. In this manner, increased strength and flexibility are realized.

According to another aspect of the invention, each of the flexible elements comprises a pair of rods flexibly joined whereby upon impact from solid objects the rods are caused to buckle laterally. Upon release from the objects the rods return to their original position.

It is another object of the invention to provide an air cushion vehicle having a flexible skirt arrangement for preventing the leakage of air from the air bubble formed beneath the vehicle.

It is still another object of the invention to provide an air cushion vehicle in which a plurality of flexible elements retain the air forming the cushion beneath the vehicle and are caused to buckle laterally upon impact with a solid object.

Other objects of the invention will become apparent from the following description read in conjunction with the accompanying drawings, in which:

FIG. 1 is a perspective view of an air cushion vehicle embodying the flexible skirt arangement of the invention, FIG. 2 is a perspective view of one embodiment of a single flexible element of the flexible skirt arrangement of FIG. 1, FIG. 3 is a partial sectional view of the device of FIG. 1 taken along the line 3—3 illustrating the flexible skirt arrangement along the side of the vehicle 11, FIG. 4 illustrates the position of a portion of the flexible skirt of FIG. 3 when the vehicle of FIG. 1 is passing over a solid object, FIG. 5 is a view of the flexible skirt portion of the front of the vehicle of FIG. 1 when the vehicle is passing over a solid object, FIG. 6 is a view of a flexible skirt element according to another aspect of the invention illustrating the lateral buckling action upon impact with a solid object, FIG. 7 is a sectional view taken along the lines 7—7 of FIG. 6 illustrating a portion of the flexible skirt arrangement of FIG. 6 without the lateral buckling action, FIG. 8 is a sectional view taken along the lines 8—8 of FIG. 6 illustrating the buckling action of the flexible skirt element of FIG. 7, and FIG. 9 is a perspective view of a pair of flexible elements of the skirt of FIG. 6.

Referring now to FIG. 1, a perspective view of an air cushion vehicle embodying the flexible skirt arrangement of the invention, there is shown a vehicle 11 for traveling over a surface 13 which may be either on land or water. The vehicle 11 may be designed according to standard principles of air cushion vehicle design known in the art which are not a part of this invention. Means according to known concepts are provided for maintaining a spaced relation between the base 12 of the vehicle 11 and the surface 13 over which the vehicle is to hover or travel.

The spaced relation may be created in accordance with a standard air cushion vehicle design by directing a volume of low pressure air to the base 12 to create a cushion or bubble of air which exerts sufficient pressure to support the vehicle 11 above the surface 13.

A flexible skirt 14 is suitably attached to the base 12 and extends around at least a portion of the vehicle 11 and thereby prevent air leakage from the air cushion. The skirt 14 may extend around the entire base 12 to completely enclose the air cushion and is comprised of a plurality of flexible skirt elements substantially vertically positioned with respect to the base 12 and in juxtaposed relation therewith. The skirt 14 functions to prevent air from the cushion from escaping thereby maintaining the pressure therein. Additionally, the skirt 14 is flexible to pass solid objects over which the base 12 travels. The skirt 14 may be inclined at an angle as shown in FIG. 1 in order to improve the flexibility of operation.

Referring now to FIGS. 2 and 3, there is illustrated a flexible element of the skirt arrangement of FIG. 1 according to a principal aspect of the invention. In FIG. 2 a flexible skirt element or main rod 17 is shown which is triangularly shaped having an angular or V cross section. Each of the corners of the element or main rod 17 has embedded therein for reinforcing purposes rods 18, 19, and 20. Each of the reinforcing rods 18, 19, and 20 extends throughout the length of the element 17. The element 17 may be constructed of a lightweight rubber type material such as urethane with the reinforcing rods 18, 19, and 20 being of steel suitably bonded to the urethane. The angular or V shape of the element 17 provides stability in the direction of the pressure from the air bubble beneath the vehicle 11, and is flexible in all directions of impact from obstacles over which the vehicle 11 passes.

In FIG. 3, a partial sectional view of the skirt arrangement of FIG. 1, a plurality of the elements 17 are arranged to form the flexible skirt arrangement of FIG. 1. The flexible elements 17 are arranged in juxtaposed relation with each other with the upper portion thereof rigidly attached to the base 12 of the vehicle 11 of FIG. 1. The rods 18–20 are wholly embedded in the rubber material of the elements 17 and therefore need not be attached to the base 12.

In the operation of the vehicle 11 of FIG. 1, the air bubble generated beneath the base 12 maintains a spaced relation between the base 12 and the surface 13. The skirt 14 forms a part of the vehicle 11 for air cushion effect as the vehicle is suspended on a cushion or bubble of air which exists between the base 12 and the surface 13.

As shown in FIG. 3, the air bubble generates pressure which is directed toward the elements 17 in the direction as shown by the arrow 21. The air pressure from the air bubble directed against each of the elements 17 increases the stability of the flexible skirt and prevents leakage of air from the air bubble. Forces from the atmosphere also bear against the elements 17 as shown by the arrow 22.

Referring now to FIGS. 4 and 5, there is illustrated the effect of impact of an obstacle upon the flexible skirt of the vehicle 11. In FIG. 4, a view of the flexible skirt elements on the side of the vehicle 11, the elements 17 will bend upon impact from an object 23 in the manner as illustrated. The angular form of the elements or rods 17 provides the desired flexibility when the elements on a side of the vehicle 11 are impacted. When the vehicle 11 has completely passed over the object, each of the elements 17 returns to its original position.

In the example of FIG. 4, the elements 17 along the side of the vehicle 11 are impacted by the obstacle 23. The pressure of the air cushion or bubble loads the elements 17 in a direction perpendicular to the direction of impact from the obstacle 23. Elements at the front of the vehicle 11 will receive an impact from an object as illustrated in FIG. 5. The elements 17 in FIG. 5 are flexible when impacted by an object 23, and return to their normal shape when the vehicle 11 has passed over the object 23.

Referring now to FIGS. 6, 7, 8, and 9, there is illustrated another aspect of the invention in which triangularly shaped rods are flexibly joined in pairs. The rods 25 and 26 in FIG. 7 are joined by an adhesive bonding strip 27 to form a unitary flexible main rod. Each of the rods 25 and 26 is triangularly shaped and has embedded therein at least two reinforcing rods 28 and 29.

The rods 25 and 26 joined together are arranged in juxtaposed relation with other similarly formed rods to form the flexible skirt 14 of FIG. 1. The portion of the skirt 14 illustrated in FIG. 7 is located in the front of vehicle 11 with loads from the atmosphere bearing against the flexible skirt as shown by the arrow 30 and pressure for the air cushion bearing against the skirt as shown by the arrow 33.

Loads from the atmosphere bear against the flexible rods about their major structural axes up to a predetermined strength. Loads such as solid objects will cause the rods to rotate and bend about their minor structural axes. In FIG. 8 there is illustrated the position of the rods 25 and 26 after being impacted by a solid object for example. As shown in FIG. 8 the rods 25 and 26 have rotated about the adhesive strip 27 with loads from the atmosphere indicated at the arrow 30 now bearing against the rods about a minor structural axis 31 rather than the major structural axis 32. Thus, as illustrated in FIG. 6, the rods 25 and 26 will bend about their minor axes thereby providing complete flexibility of operation.

The provision of a flexible skirt around the base of an air cushion vehicle allows operation of the vehicle at heights heretofore impractical.

Although the invention has been described and illustrated in detail, it is to be clearly understood that the same is by way of illustration and example only, and is not to be taken by way of limitation, the spirit and scope of this invention being limited only by the terms of the appended claims.

I claim:
1. In an air cushion vehicle wherein means are provided for maintaining a spaced relation between the underside of said vehicle and a surface over which the vehicle is to hover or travel, said means including means for creating and maintaining an air cushion beneath said vehicle, and wherein is provided
  a plurality of discrete flexible elements enclosing a portion of said air cushion for retaining the latter and passing solid objects over which the underside of said vehicle passes,
  each of said discrete flexible elements comprising main rod means having embedded therein at least two reinforcing rods, each said main rod means having a pair of lateral wall portions each disposed at an acute angle with respect to the other and convergent away from said air cushion for providing greater stability when loaded by said air cushion than when loaded by said objects.

2. The device of claim 1 wherein each of said main rod means comprises a pair of rods flexibly joined.

3. The device of claim 1 wherein each of said main rod means comprises a pair of rods flexibly joined, and wherein each rod of the flexibly joined pair has a triangularly shaped cross section.

4. The device of claim 1 wherein said main rod means has an angular cross section to provide flexibility in all directions of load.

References Cited by the Examiner

UNITED STATES PATENTS

| 2,387,627 | 10/1945 | Warner. | |
| 2,743,787 | 5/1956 | Seck | 180—7 X |
| 3,055,446 | 9/1962 | Vaughn | 180—7 |

FOREIGN PATENTS

| 1,251,967 | 12/1960 | France. |
| 137,405 | 4/1961 | U.S.S.R. |

OTHER REFERENCES

Publication: "Science and Mechanics," June 1960, pp. 73–77.

A. HARRY LEVY, *Primary Examiner.*